United States Patent

[11] 3,617,725

[72] Inventor  Lawrence R. Smith
                Phoenix, Ariz.
[21] Appl. No. 770,288
[22] Filed      Oct. 24, 1968
[45] Patented   Nov. 2, 1971
[73] Assignee   Motorola, Inc.
                Franklin Park, Ill.

[54] CONTROL CHANNEL FOR AN OPTIMIZING CONTROL SYSTEM
8 Claims, 4 Drawing Figs.

[52] U.S. Cl. ........................................ 235/183,
     235/150.1, 235/150.51, 235/151.1, 307/238,
     318/561
[51] Int. Cl. ....................................... G06g 7/18,
     G06g 7/66
[50] Field of Search .......................... 235/150.1,
     151.1, 181, 183; 318/561

[56]            References Cited
            UNITED STATES PATENTS
3,374,362  3/1968  Miller ........................... 235/183 X
3,428,794  2/1969  Norsworthy .................. 235/183 X
3,465,134  9/1969  James ............................ 235/183

OTHER REFERENCES
1. Douce et al: A Self-Optimizing Non-Linear Control System, Instit. of El. Eng. (Proceedings), July 1961, pp. 441–448.

2. Gulbenk et al: How Modules Make Complex Design Simple; Electronics, Dec. 28, 1964, pp. 50–54.

Primary Examiner—Malcolm A. Morrison
Assistant Examiner—Felix D. Gruber
Attorney—Mueller and Aichele ABSTRACT: A control channel circuit for a control system utilizing more than one channel is disclosed wherein orthogonal modulation signals are provided for each control channel. In each control channel circuit an analog voltage signal corresponding to the gradient of the process performance indicating signal for the particular process variable is obtained by sequentially gating positive and negative pulses to an integrator circuit. The pulses which correspond to the performance indicating signal and its complement accumulate in the integrator circuit to give their net sum.

The net sum determines whether that process variable is at optimum and if not, the net sum is used, through a memory circuit, for subsequently controlling the process variable. The net sum is updated or improved at predetermined intervals to move the process variable toward optimum. The integrator circuit has a long time-constant of integration so that the integration is independent of the base period. Both the storage capacitor of the integrator circuit and the memory capacitor of the memory circuit, as well as the other components of the circuit, are such that leakage from the capacitors is essentially zero whereby the analog voltage values thereon are maintained for as long a period of time as is needed which may be hours or even days.

INVENTOR.
LAWRENCE R. SMITH

CONTROL CHANNEL FOR AN OPTIMIZING CONTROL SYSTEM

RELATED APPLICATIONS

This application is related to application Ser. No. 770,284 entitled "Optimizing Control Systems,"X filed Oct. 24, 1968, in the nXame of the present applicant and now abandoned, to application Ser. No. 819,877 entitled "Optimizing Control Systems, " filed Apr. 28, 1969, in the name of the present applicant, as a continuationH-in-part of said application Ser. No. 770,284, and to the application Ser. No. 702,440 entitled "Analog Memory System," filed Feb. 1, 1968 in the name of the present applicant now U.S. Pat. No. 3,551,698.

BACKGROUND OF THE INVENTION

This invention relates to control systems and particularly to an analog control channel for utilization in a control system.

As used herein the term "process" means any chemical, mechanical or electrical actions or any combination thereof or other actions used to effect a result.

Analog control of single control loops dates from the flyball governors of the 18 th century steam engines through to the industrial three-mode controllers of the 1930's. Present day modern processes generally have a large plurality of such control loops which are highly interacting as to process performance. That is, process performance improves when one controlled variable is changed only and only if the other controlled variables are simultaneously changed. Therefore, in controlling modern processes it is necessary to take into account the multidimensional aspect of each process being controlled. Such an approach can be termed "optimization of the process." One can either maximize or minimize a given performance objective or criterion. For example, if costs are to be minimized, such as having minimum fuel input, then the performance criterion should be minimized. However, if costs are to be minimized by maximizing efficiency, then a measurement or sets of measurements for indicating efficiency would be utilized and that would then be maximized.

Even though there is required a multidimensional control approach each control loop in a process control system must to a certain extent act independently, i.e., its control signal should be determined independent of the other control signals in the system. This approach facilitates the adjustments in the individual control channels.

Also borne in mind that the process performance varies with time. It is quite difficult, if not impossible, for an operator to adjust regulated variables to provide optimum performance. For example, perturbations or disturbances in the process may be caused by unpredicted change of flows or temperatures and the like. In a process having an uncontrolled disturbance, it is desirable to make process performance the best possible, i.e., optimizing performance within the constraint that the disturbance cannot be immediately removed and therefore must be compensated for. Then the process is returned toward optimum operation (without such a disturbance) while maintaining performance the best possible during such return. This action is termed "returning the process to normal in an optimal manner." Returning a process to "normal" in an optimum manner may not be the shortest period of time of return. In so doing, the effect of changing a variable on the system performance is very important because of the interactions of the variables. Therefore, there should be provided a control channel which is responsive to the total system performance and yet can measure the effect of the total system performance by the variation in the individual variables being controlled.

The term "process" as used herein includes any action of a chemical, electrical, mechanical nature or combinations thereof.

SUMMARY OF THE INVENTION

It is an object of this invention to provide a control channel for a process control system which is responsive to the total system performance and which can measure how to change a control variable with respect to changes in system performance in the linear manner.

A feature of the present invention is the positive and negative binary multiplication of an analog signal indicative of system performance to provide an integratable signal indicative of the relationship of variations of system performance as caused by variations in a given variable being controlled by the given control channel.

It is another feature of he present invention to continuously modulate a variable being controlled and to derive a performance indicating signal in response to such modulation which is unique to the variable being modulated such that a measurement can be made to indicate how system performance is varying in accordance with the modulation of the controlled variable.

A control channel for a process control system in accordance with this invention has an input circuit comprising an analog plus and minus one multiplier gating system which utilizes a complementary analog signal indicative of system performance. Complementary analog signals are ones of equal amplitudes but opposite polarities. Modulation of the gating system gates the performance indicating signal to an integrator in a manner orthogonal with respect to the same performance indicating signal being gated to the other control channels. If the system is operating at optimum point with respect to the variable being controlled by the particular control channel, then the integrator will integrate the two opposite polarity analog signals to zero. If, however, system performance is improved during the modulation of the controlled variable, then the integrator will integrate the performance indicating signal in such a manner as to indicate the direction of system performance improvement as the variable is being modulated. At the end of a given cycle of modulation, the integrated value of the signal is supplied to a memory system which then in turn generates a control signal for the process being controlled.

A pair of MOSFETs receive from a process measurement device opposite-polarity equal-amplitude analog signals for selectively gating same to a common junction. The gating of the opposite-polarity analog signal corresponds to a plus and minus one multiplication of the analog signal amplitude. A third MOSFET is interposed between the multiplying gates and an integrator providing a very high impedance to provide a long time integration constant. The integrator over a period of cycles will even out the multiplication provided the amplitudes remain the same over a finite period. At the end of a given integration cycle, the magnitude of the integrated signal is supplied through a MOSFET gate to an analog memory unit which then signal supplies on a continuous basis the magnitude of the integrated signal to a control element in a control system. Unequal amplitudes over the integration period result in a change in the stored signal supplying a different amplitude control signal.

In carrying out the invention in one form there is provided, in a process control system wherein a contemporaneous electrical analog process performance indicating signal is sensed during time intervals of predetermined duration spaced from each other, said contemporaneous process performance indicating signal and its complement are made available during said time intervals, and wherein a clock and signal modulation source supplies an electrical control signal at such predetermined intervals, supplies an electrical modulation signal having positive and negative half cycles of a frequency greater than that of said control signal for effecting modulation of a process variable during said time interval, and, in consequence, effecting modulation of said performance signal, and supplies electrical pulses at a predetermined frequency substantially greater than that of said modulation frequency, an improved control channel circuit for controlling said process variable comprising the combination of: circuit means for obtaining an improved process performance indicating signal at the end of each of said time intervals of predetermined duration comprising means controlled by said electrical pulses of said clock and modulation source for gating pulses of said contemporaneous process performance indicating signal and its complement in succession to an output circuit during each of said time intervals of predetermined duration, and a long time-constant integrating circuit for receiving said gated pulses of said contemporaneous process performance indicating signal throughout each of said time intervals of predetermined duration and storing the net accumulation of said gated pulses as an analog signal, long time memory capability memory means activated by said electrical control signal at the end of each of said time intervals of predetermined duration for receiving and storing an analog signal from said integrating circuit corresponding to said net accumulated gated pulses, and means responsive to said net analog signal in said memory means for controlling said process variable in accordance therewith, said memory means being rendered unresponsive to said analog signal in said integrating circuit by said electrical control signal at the beginning of each succeeding one of said time intervals of predetermined duration.

THE DRAWINGS

DETAILED DESCRIPTION OF THE ILLUSTRATIVE EMBODIMENT

Figure 3:
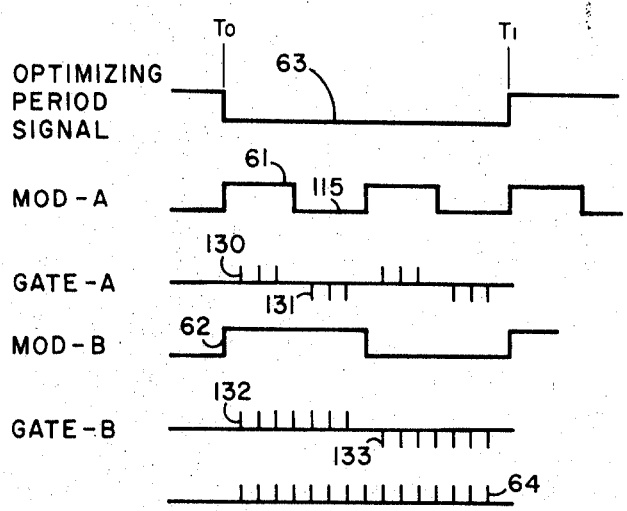
FIG. 3 is a set of timing diagrams used to illustrate the operation of the illustrated control channel in the illustrated environment.

A control system utilizing a plurality of control channels is used as a basis for describing the operation of the present invention concerning a given control channel. The process being controlled is represented by block 10 which may be any type of process for example, catalytic cracking plant, a pumping station, a gun-powder factory, an automatic assembly line and the like. Since many of these are well known, details need not be given. Each process will have a certain number of uncontrolled or uncontrollable inputs 11. Such inputs can be represented by weather including temperature, humidity and the like as well as some unpredictable disturbances in a process. As an example, there may be coking of the lines in a petrochemical process while other uncontrolled disturbances may occur in other processes. It is desired to reduce the effect of such uncontrolled disturbances on process performance as much as possible. The later described control channel facilitates control or compensation of effects of such uncontrolled disturbances on process performance. In addition to the uncontrolled inputs the process receives controlled inputs 12 from a plurality of control elements 34A plus a control input 13 from control element 14.

Element 14 receives a modulated control signal over line 15 from a later described control channel built in accordance with the teachings of the present invention. The control element 14 may be any well-known element for converting an electrical signal or energy into mechanical energy, for example, a solenoid, or a motor, for controlling a valve. As a further example, it may be an electrical converter such as to supply electrical power to a heater element. In the event that the parameter controlled by control element 14 is the temperature of the process, the control element 14 might be a valve controlling the flow of steam at high temperature in response to an electrical signal appearing on line 15. Such control elements being well known none is further specifically described in this application. The signal on line 13 may therefore be, also as is well known, an electrical signal, a mechanical signal such as a movement, or a flow such as steam flow. Similar considerations apply to the box 34A Other Control Elements from which signals 12 go to the process 10.

The control element 14 and the other control elements 34A could be shown as combined with the process 10 in which event the signals going to the process 10 would be the electrical signal on line 15 and the electrical signal on line 34. This latter manner of showing diagrammatic elements is utilized in the aforesaid copending application Ser. No. 819,877.

Continuing on now with description of the process control system a plurality of measurements are taken in process 10 and supplied over a like plurality of lines 16 to a computer 17. The process variables of the process 10 such, for example, as temperature, pressure and the like are sensed by appropriate transducers, as is well known, that convert the desired quantities into electrical signals which appear on line 16 and are transmitted to the computer. Computer 17 can be a general purpose digital computer or an analog computer especially designed and constructed for the control of process 10. These measurements each are assigned a priority or weight and then summed in a known electrical circuit (digital or analog) to provide a single signal $P(t)$ supplied over line 18 from computer 17. Signal $P(t)$ indicates process performance as will become apparent. The important thing to note for practicing the present invention is that computer 17 receives all of the measurements which may relate to the uncontrolled disturbances or to the controlled variables of process 10, assigns a weight to each one or a combination of such measurements and then combines all the measurement signals into one as an indication of system performance in accordance with the priorities or weights assigned to the respective measurements. It should be noted that some of the weights may be positive and negative such that when the process 10 is operating at optimum, that the signal $P(t)$ will be at a minimum or maximum potential. For simplicity, the present discussion will assume that all weights are positive and optimum occurs when the signal $P(t)$ is at a minimum.

Phase splitter 30 receives signal $P(t)$ on line 18 and inverts the signal and supplies a pair of signals of equal amplitude but of opposite polarities respectively over lines 31 and 32. Line 31 carries the signal $P(t)$ which is identical in amplitude and polarity to the signal on line 18. Line 32 carries the signal $\overline{P}(t)$ which has the same amplitude but opposite polarity of signal $P(t)$ on line 31, i.e., is the complement thereof. In accordance with one constructed embodiment of the system utilizing a control channel of this invention, the signal on line 31 was always positive and the signal on line 32 was always negative. This action with the later described gating performs the function of multiplying $P(t)$ by $+1$ and $-1$ and the two signals are termed "complementary" because they are of equal amplitudes but opposite polarities. By gating $P(t)$ during the half cycle of modulation when the modulation is positive and by gating $\overline{P}(t)$ during the half cycle of modulation when the modulation is negative, the composite signal becomes the product of the signal $P(t)$ and the modulation signal. This composite signal is then integrated by the integrator. The change in integrator output over one modulation cycle is proportional to the gradient or slope of $P(t)$ in the plane of the variable having this modulation.

The complementary system performance indicating signals $P(t)$ and $\overline{P}(t)$ are supplied to a plurality of control channels as indicated by "other units" box 33 which in turn supplies control signals over a set of lines represented by single line 34 to a plurality of control elements 34A such as valves and the like. These other control elements 34A effect control over a plurality of controlled variables to process 10 as indicated by lines 12.

Figure 2:
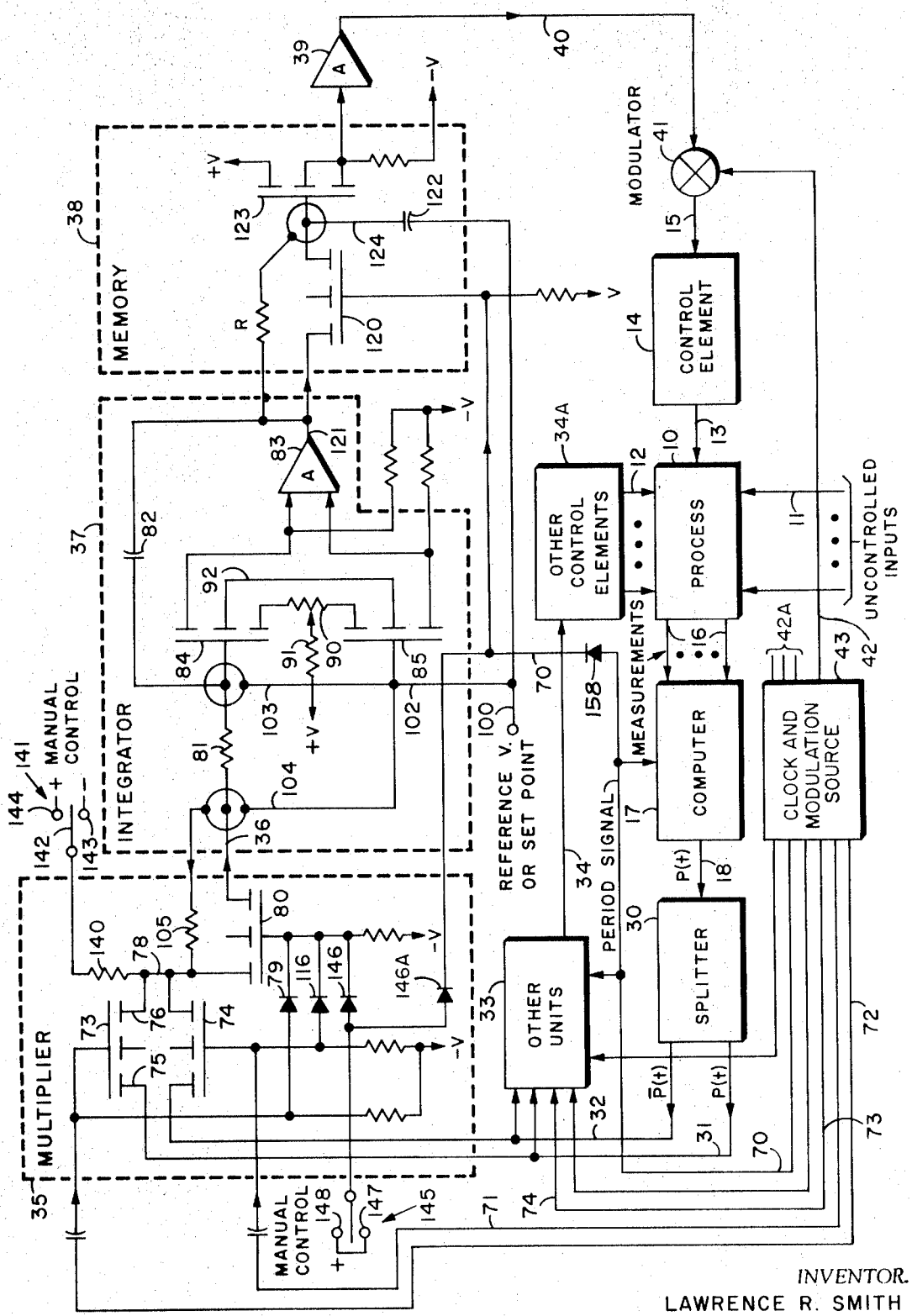
FIG. 2 is a combined block and schematic diagram of a control channel in accordance with the teachings of the present invention and shown in its operating environment in a control system. The elements of the control system are shown in block diagram form since a detailed understanding thereof is not necessary to a complete understanding of the present invention.

Lines 31 and 32 are also connected to the illustrated control channel via multiplier circuit 35. The multiplier 35 effectively multiplies the signal P(t) by the signal on line 42. This is accomplished by switching means, but the envelope of the resultant signal on line 36 is proportional to the product of the above two signals. In multiplier input circuit 35 the performance indicating signal is successively multiplied by binary plus and minus one to provide successive sets of opposite polarity signals over line 36 to integrator 37. The modulation signal is a square-wave signal generated in any well known manner, as for example, by counting monostable pulses as described in the applicant's copending application Ser. No. 819,877. This signal modulates the controlled variable about its average value. This modulation signal can be represented by a constant times either plus one (+1) or minus one (−1) depending upon which half cycle of modulation is being considered. The plus and minus one signals are the high and low states of the modulation signal on line 42 of FIG. 2.

If the performance of the process 10 is at optimum the integration results in zero change whereas if it is not at optimum the integration results in a change indicative of the gradient necessary to provide a change in the controlled variable on line 13 to return the system toward optimum.

The performance indicating signal can be represented as a function of each of the controlled variables. The purpose of the optimizer is to locate the optimum (maximum or minimum of this function). This function can be visualized as a multiple dimensioned contour map where elevation is the performance and the other coordinates are the variables under control. At any instant of time the system is located at some point on this contour map. If deviation from this point is small, the area immediately surrounding this point can be represented by a multiple dimensional plane. The gradients are the projected slopes of this plane on each of the coordinates or controlled variables. Zero slope says that no matter in which direction the process moves the performance will not change. This is also zero gradient for each of the controlled variables. This description is expressed mathematically subsequently in this specification. The gradients are the coefficients $a_1, a_2, .. a_n$.

The output signal of the integrator is supplied to memory 38 only after completion of an integrating cycle as will be later described. Memory 38 then, in turn, supplies a control signal through amplifier 39 thence over line 40 to modulator 41. Modulator 41 receives a modulating signal over line 42 from clock source 43 to modulate the control signal such that the control element effects a modulation of the controlled variable in process 10 to more or less perform a so-called "dither" in the variable such that the process performance signal on line 18 varies as a result of such modulation. The clock and modulation source 43 is a four variable or signal device, modulation signals on line 42, modulation signals on line 42A, gating pulses on lines 71 and 72 and a period signal on line 70. These signals are shown in FIG. 3 and may be generated by any well known counting device, as for example, that described in the applicant's copending application Ser. No. 819,877. As there described, a pulse counter generates square waves which are subharmonics of the frequency source. Such waves are depicted as the period signal (lowest frequency) and MOD A and MOD B signals of FIG. 3. The period signal gates the device (43) to provide pulses that are present only during the measurement half of the period signal, as seen in FIG. 3.

Figure 1:
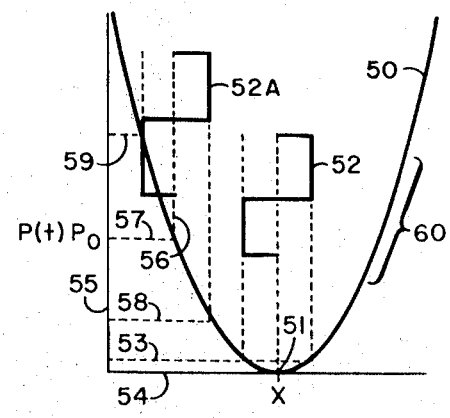
FIG. 1 is a graph showing system performance variations with respect to varying a controlled variable and the effect of modulation on system performance of that variable.

The effect on the process performance signal by the modulation of the controlled variable is next explained for a one variable system with respect to the graph shown in FIG. 1. Curve 50 represents the variation of the performance signal P(t) with respect to a controlled variable X. It is desired to minimize the value of the performance indicating signal with respect to variations in the controlled variable. Therefore the optimum operating point is at point 51. Assume that this process is operating at or around point 51. The modulation of the controlled variable represented on line 13 (FIG. 2) is indicated by the square wave 52 in FIG. 1. It is seen that as the modulation first takes the variable further away from the vertical ordinate the process indicating signal will increase in amplitude a slight amount as indicated by line 53. Upon returning the modulation toward the vertical ordinate, the performance signal will reduce to point 51 and then again increase along the response line 50 to a maximum height again indicated by line 53. By multiplying the performance indicating signal by +1 during the first half of the modulation cycle and by −1 during the second half, then integrating the two products, the integrated result will be zero for operation centered around point 51. Accordingly, line 54, the horizontal ordinate, represents the magnitude of the performance indicating signal at the optimum point 51. This fact requires the assumption that the modulation has equal periods of time in both halves. Therefore there will be no change in the signal on line 40 which permits the process 10 to continue to operate around optimum point 51 as caused by the modulator 41 modulating the control signal.

Assume next that the operating point of the system or the process 10 as caused by the signal on line 40 is represented by the vertical line 56 which corresponds to a system performance signal $P_0$ indicated by horizontal line 57. Then the modulation signal 52A during its first half cycle causes the controlled variable to move away from the vertical ordinate 55 resulting in an improvement in performance indicating signal as indicated by line 58. During the second half of the modulation cycle 52A, i.e., during the excursion of the modulation toward vertical ordinate 55 there is an increase in amplitude of the performance indicating signal (decreased performance) up to horizontal line 59. It is remembered that during the first half of the modulation cycle the relatively positive signal P(t) supplied over line 36 is gated to integrator 37 whereas during the second half the relatively negative signal $\overline{P}(t)$ is supplied to line 36. Since the amplitudes as indicated respectively by lines 58 and 59 are different, there will be a nonzero result indicating that the process performance is not at optimum value. Since the second half causes the performance signal to be inverted, i.e., utilizes the line 32 signal, the net integrated output voltage of integrator 37 which is inverting will be positive with respect to the previous integrated voltage causing an increase in the amplitude of the voltage stored in memory 38. The signal on line 40 is correspondingly increased to move the magnitude of the variable X away from the vertical ordinate 55 and toward the optimum operating point 51.

It can be similarly stated that for operation of the process in the portion 60 of curve 50 there will be a corresponding increase in the stored signal magnitude in memory 38 to cause a corresponding decrease in the amplitude of the signal on line 40 to thereby move the magnitude of the variable X toward the vertical ordinate 55 and thence toward optimum operating point 51.

Referring next to FIG. 3 there is shown a timing diagram and the timing signals utilized to operate the control channel with respect to process 10. The clock 43 generates the signals 61 and 62, 63 and 64 while the gate signals 130, 131, 132 and 133 are generated by gating pulses 64 with signals 61 and 62 as later described. The period signal 63 on line 70 controls the operation of the channel including integrator 37, units 33 and memory 38. Additionally period signal 63 is supplied to computer 17 which when positive adjusts the output operation of the computer 17 to the center of its operating range. Clock 43 additionally generates signals 61 and 62 which are the modulate A and the modulate B signals. The period signal 63 is divided (not necessarily equally) into a delay portion (the positive operation of 63) and the measurement portion (negative portion of 63). The delay period for example could be equal to the measurement period.

Modulate A signal is supplied over line 42 to modulator 41. Modulate B and other modulation signals are supplied over line 42A to the modulators of the other units. Modulate B signal is supplied over a separate line to a modulator B (not shown) but being part of other units 33. Other modulation signals are supplied over separate lines 42A to their respective modulators. The gating pulses 130 are supplied over line 71 to multiplier input circuit 35. The gating pulses 131 are supplied over line 72 to the complement gating circuit of multiplier 35. The gating pulses of the other units are supplied over lines 73 and 74 to the multiplier gates of the other units. Gating pulses 130, 131, 132 and 133 are all positive pulses, the sets or bursts of pulses being shown on one line to more clearly indicate their timing relationship.

The constraint on the modulation is that all of the modulation signals supplied to the respective control channels be orthogonal. Two signals $X_1$ and $X_j$ are orthogonal over interval $T_o$ to $T_l$ if the relationship $$\int_{T_0}^{T_1} x_i x_j dt \begin{array}{l} = 1 \text{ for } i = j \\ = 0 \text{ for } i \neq j \end{array}$$

That is, two signals $X_i$ and $X_j$ are orthogonal over the time interval from $T_0$ to $T_1$ if the time integral of their product is zero over this period and if the time integral of their square is unity over this same period. Square wave signals with amplitudes of ±1 are orthogonal if they are harmonics of a base or lowest frequency with period of $T_1-T_o$ or in quadrature to this signal or quadrature to harmonics of this base signal.

For small signal deviations from an initial point (small modulations) any multi-dimensional surface representation of a multi-dimensional process can be approximated by a linear equation.

$$P = P_0 + a_1 x_1 + a_2 x_2 + a_3 x_3 + \ldots + a_n x_n$$

where $a_1 = dP/dx_1$, $a_2 = dP/dx_2$, ... $a_n = dP/dx_n$, are the gradients of the performance signal $p$. The gradients are the projected slopes of the above plane on each of the axes $x_1, x_2, \ldots x_n$.

$p$ is a signal indicating process performance, $a$'s are weighting factors and $x$'s are variables, i.e., some function of time.

If the variables $x_1$ through $x_n$ are orthogonal over time interval $T_o$ and $T_1$ then $$\int_{T_0}^{T_1} x_1 \cdot P dt = a_1 = \frac{dP}{dx_1}$$

$$\int_{T_0}^{T_1} x_i \cdot P dt = a_i = \frac{dP}{dx_i}$$

That is, multiplication of the resulting total performance signal by the modulation signal of a variable followed by integration over the base time period will produce an integrator output that changes an amount equal to the gradient of the performance in the plane of the variable.

Consequently, each variable is changed at the end of the base period by an amount equal to its gradient and independent of the gradients of the other variables.

In this manner the effect that each variable produces on the single performance signal is measured and separated. By changing each variable proportional to its respective gradient, the performance signal will be optimized via a path of steepest ascent or descent as the case may be.

Continuing on with the description of the multiplier input circuit 35, the gate A pulses 130 and 131 are supplied respectively to the field electrodes of MOSFETs 73 and 74. When a signal on the gate or field electrode of MOSFETs 73 and 74 (of the type used in a constructed embodiment) is positive with respect to the source electrode there is a low impedance provided between the source and drain electrodes 75 and 76 to thereby open the gates to permit the signals on line 31 to supply the performance indicating signals to summing junctions on line 78. The gating signal on the field electrode of MOSFET 73 also gates the field electrode of MOSFET 80 through diode 79 and the gating signal on the field electrode of MOSFET 74 also gates the field electrode of MOSFET 80 through diode 116. Some of the MOSFETs are made current conductive by a negative control signal; in any event the MOSFETs are switched between current conduction and nonconduction by the gate pulse signals. Simultaneously, modulation signal on line 72 is supplied through isolating diode 79 to gate of the MOSFET 80 field electrode to make it current conductive between its source and drain electrodes. Therefore the signal P (t) on line 78 is then supplied to lines 36 at the input to integrator 37. During the second half of the modulation cycle MOSFET 73 is switched to current nonconduction while MOSFET 74 is repeatedly switched to current conduction by the gate pulses on line 71. During the first half of the modulation cycle MOSFET 74 is switched to current nonconduction while MOSFET 73 is repeatedly switched to current conduction by the pulses on line 72. Diode 116 passes the line 71 signal to cause MOSFET 80 to continue conduction for passing $\overline{P}(t)$ to integrator 37.

The envelopes of the gate pulse signals are equal to their respective modulation signal. For example, the pulses 130 of FIG. 3 are outlined by the square wave pulse 61 of MOD A. The gates are pulsed N times during each half cycle of the fastest modulation period. If the pulse width of the gate pulses are controlled and the number of pulses is always N, the time of integration will be $N \times T_p$ and will be independent of the period of the modulation. This is a sampled data system and if the time interval between pulses is small compared with the response time of the system there will not be any loss in information because of sampling. The sampling not only produces an integrator with scale factor that does not change with clock frequency but also produces an integrator capable of extreme accuracy when integrating over very long periods.

The integrator 37 has a time constant determined by the value of the resistance of resistor 81 and the capacitance of integrating capacitor 82. The effective time constant of integration is $N \times T_{P/T1} - T_o$ which produces a true integrator with a scale factor that does not change with the period $T_1 - T_o$. Integrator 37 is of usual active element integrator design. A pair of MOSFETs 84 and 85 provide dual inputs to operational amplifier 83 to provide an extremely high impedance input such that the integration is independent of the base period. The base period is the time when all gates are "off," that is no gating pulses are being supplied. The integrating capacitor 82 connects between the output of amplifier 83 and the field electrode of MOSFET 84. Resistor 90 connected between the two source electrodes of MOSFETs 84 and 85 are connected through an adjustable tap of resistor 90 and resistor 91 to a reference voltage for centering the operation of the MOSFETs 84 and 85. The substrates of the MOSFETs 84 and 85 are connected together by a single wire 92 but not connected to any reference potential. It is found that this connection provides good balancing between the two MOSFETs but yet provides for extremely high impedances. Operation of the integrator 37 is well understood and will not be described for that reason. The functioning of the integrator 83 and the input MOSFETs 84 and 85 is disclosed and claimed in the applicant's copending application Ser. No. 702,440, referred to above.

Another input to the integrator 37 is over line 100 which carries a reference voltage for the system. The reference is to this signal when it is stated that $\overline{P}(t)$ is equal in amplitude but opposite in polarity. Line 102 connects the field electrode of MOSFET 85 to line 100 and thereby supplies the reference potential to one input of amplifier 83. Additionally, line 100 signal is supplied over lines 103 and 104 to guard planes (later described) around resistor 81 and capacitor 82 to reduce the leakage path of the integrating capacitor 82 and its connection to resistor 81. This guard plane is also connected through high impedance resistor 105 to summing junction 78. The purpose of resistor 105 is that when the MOSFET 80 is turned off, it presents a normally high impedance between the source and drain electrodes. However, there is still a finite leakage path. By connecting the reference voltage through the resistor 105 to junction 78 it will assume the reference voltage and thereby reduce the voltage across the source and drain electrodes of MOSFET 80 to near zero and thereby reduce the leakage current. For real-time systems, the time periods when neither MOSFET is gated is very long compared to the gated time. When all MOSFETs are off, the resistor 105 reduces the voltage across the leakage path from the field electrode of MOSFET 84 through resistor 81 and MOSFET 82 near zero.

If the voltage across this path is zero, the current will be zero which prevents capacitor 82 from discharging during the off-time or base time.

Figure 4:
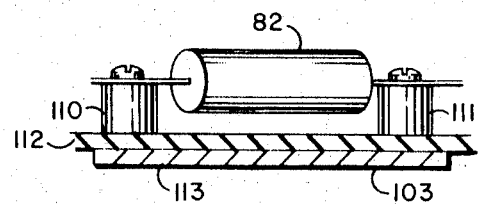
FIG. 4 is a diagrammatic showing of a voltage protection system for use in an integrator for preventing leakage paths from degrading operation thereof.

The guard planes are described by reference to FIG. 4. Capacitor 82 is shown mounted between a pair of upstanding high-quality insulating studs 110 and 111 on insulating board 112 of the printed circuit type. On the reverse or underside of board 112 there is a conductive plate 113 which has an electrical connection to line 103. Accordingly the reference voltage is supplied to the guard plane 113 and thereby reduces the voltage across the studs 110 and 111 to thereby reduce the leakage of capacitor 82 to its environment. This enables the capacitor 82 to maintain its charge over a longer period of time, i.e., reduces its drift. It is understood that resistor 81 is similarly mounted. The fact that the capacitor 82 has its output terminal connected to the field electrode of MOSFET 84 means that path is very high impedance. Therefore minimum leakage is provided to capacitor 82.

Returning now to the multiplier input circuit 35, when modulation signal A goes negative as during half cycle 115 (FIG. 3) MOSFET 73 is switched to current nonconduction between its source and drain electrodes 75 and 76. The polarity of the signal on line 71 is now pulsed positive N times making MOSFET 74 current conductive during these pulses to pass the $\bar{P}(t)$ signal to summing junction on line 78. It is remembered that this is the negative of the $P(t)$ signal on line 31 to effect a subtraction of $P(t)$ by $\bar{P}(t)$ in integrator 37. Simultaneously therewith the gate signal on line 71 is passed through diode 116 to the field electrode of MOSFET 80 to make it current conductive for passing the performance indicating signal complement on line 32 to line 78. During half cycle 115 of modulation signal A the integrator 37 reduces the voltage across capacitor 82 as opposed to the increasing voltage occuring during the first half cycle of signal 61 to effect the substraction. As explained with respect to FIG. 1, if the process control system is operating around point 51, the magnitudes of the performance signal during both halves of the modulation signal will be the same and there will be no change at the end of the integration cycle of the voltage across capacitor 82. However, if the performance is along the gradients of curve 50 there will be a net change with the direction of change indicating how the controlled variable is to be altered to bring the process toward optimum operation.

The integrator output is disconnected from the memory capacitor 122 during the period of integration because the gate voltage as supplied by the period signal 63 on MOSFET 120 is negative during this time. At the end of the integration period (time $T_1$) this voltage becomes positive and the integrator output is applied to the memory capacitor 122. Line 70, through blocking diode 158, applies period signal 63 to the field electrode of MOSFET 120 which serves as an analog gate or switch between the output line 121 of the integrator amplifier 83 to memory 38 storage capacitor 122. An analog gate or switch will transfer the input of the switch to the output without distortion or change in DC level. Therefore the memory capacitor 122 will store a voltage thereacross in response to the voltage on capacitor 82. This stored voltage is, in turn, supplied to the field electrode of MOSFET 123 and thence to inverting amplifier 39 to thereby maintain the signal on line 40 constant during the integration period. MOSFET 123 is a drain follower amplifier. The voltage on the drain electrode (which is supplied to amplifier 39) follows the voltage on the field electrode. The integration period occurs between times $T_0$ and $T_1$ of FIG. 3 during which time the period signal 63 is negative as shown. This signal being connected to the field electrode of MOSFET 120 to make it nonconductive, capacitor 122 will consequently maintain its charge (forms a voltage pedestal) which holds the signal on line 40 constant at the level established by the previous integration. Capacitor 122 may have a guard plane as described for capacitor 82.

The voltage across the capacitor 122 during periods other than the integrating period is equal to the integrator output voltage. The voltage on field electrode of MOSFET 120 will be positive during periods other than the integration period. This positive signal makes MOSFET 120 conductive which connects capacitor 122 to the integrator output 121. The integrator output has very low impedance and consequently will charge capacitor 122 with near zero error. The operation of the amplifier 39 and the MOSFETS 120 and 123 is more fully explained in the aforesaid application Ser. No. 702,440.

The analog gate 120 and memory capacitor 122 thus maintain a constant voltage on line 40 during the period of integration and this voltage is changed after each integration period by an amount equal to the net integrator change. This means that at optimum the memory capacitor voltage and consequently the voltage on line 40 will not change because the net integration will be zero.

The line 124 capacitor, gate of 123 and drain of 120 are guarded with resistor R which is connected to the integrator output. Since the integrator voltage at optimum is nearly equal to the memory voltage at optimum, this guarding reduces the potential across the leakage paths for capacitor 122. Also the loss of charge through the field electrode of MOSFET 123 is minimized because of an extremely high impedance presented thereby.

The integration period initiated by the period signal 63 is repeated as the clock 43 successively generates period signal cycles. The interval between successive integration periods may be varied or may be constant. For example, the nonintegrating period, i.e., when the signal on line 40 is not being altered by the integrator 37, may be the same time as the length or duration of the integrating period. The interval between successive generated period signals should not be constant which allows for rejection of unwanted noise that can occur near the frequency of modulation. With no knowledge of the system noise, the best or preferred operation is obtained by randomly varying the interval. It is also remembered that the modulation A signal 61 is supplied over line 42 to modulator 41 which modulates the control signal on line 40.

It is to be noted that lines 71 and 72 may carry the modulation signal and the complementary modulation signals respectively instead of the pulsed or sampled signals as described. As mentioned previously, this will result in an integrator with a scale factor that varies with the period of modulation.

In addition, it should be noted that the sampling pulses need not be continuous during each half of the modulation cycle. In fact it is highly desirable to delay the sampling pulses by gating means and sample only during the last half or last quarter of each half of the modulation cycle. A delay of this type is analogous to a human operator making a change in a variable and waiting for the process to settle before he makes his measurement. This means that over shooting because of poorly tuned controllers or time delays introduced by system dynamics will not hinder adaption. However, the speed of response can be made to vary because of the increase of modulation, i.e., the faster the modulation or dither, the quicker the system will respond. Also, the integration period represented by period signal 63 can be lengthened or shortened as desired to change the speed of response. All that is required is that the integration period be equal to an integral number of cycles of the lowest frequency modulation signal. It need not start at the beginning of a cycle, i.e., at the zero crossing of any particular modulation signal. It can begin at any portion of the cycle as long as an integral number of cycles are included within the integration period.

The control channel can be manually controlled to preset the control channel in a process when first starting up or under emergency situations. In this regard, multiplier 35 is supplied with resistor 140 having one end connected to junction 78 and the other end connected to a manual toggle switch 141. In the unactuated position switch 141 has its center terminal 142 disposed between positive and minus terminals 143 and 144 such that no electrical connection can be made to junction 78. When manual control is desired; to decrease the signal amplitude on line 40 the center terminal 142 is moved to terminal 144 to supply a positive voltage for supplying a positive stored charge to capacitor 122. To do so the MOSFETs 80 and 120 must be made current conductive. In this regard, manual control switch 145 is connected to the field electrode of MOSFETs 80 and 120 through isolation diodes 146 and 146A. And when the center of switch 145 is set to either extreme, diodes 146 and 146A are forward biased and the MOSFETs 80 and 120 are made conductive. By ganging the center electrodes of switches 141 and 145 together the integrator output can be changed by switching the two switches 141 and 145 to either increase or decrease the voltage on line 40. The diode 158 blocks the voltages on switches 142 and 145 from the computer 17 and the clock and modulation source 43. In this manner, the process control system can be manually operated through the use of the described control channel. It is understood that other manual control means may be utilized and that the presently described control channel can be interconnected with other systems in a manner to effect bumpless transfer of process control between the control systems.

I claim:

1. A control channel circuit adapted to be utilized in a process control system which system supplies complementary performance indicating signals, and which has clock means for supplying a modulation signal for modulating such performance indicating signals and for modulating a control signal to be supplied to a control element for modulation of a controlled variable utilized in the process being controlled and for supplying a control signal at predetermined time intervals, comprising in combination, multiplier means comprising first and second MOSFETs each having a field electrode respectively connected to said clock means for respectively receiving gating signals and each MOSFET having a pair of current path electrodes, one of said current path electrodes of each of said MOSFETs being connected together and other ones of said current path electrodes being adapted to respectively receive the complementary performance indicating signals, a third MOSFET in said multiplier means having a field electrode receiving both of said gating signals such that it is always current conductive whenever either one of said first or second MOSFETs are current conductive and having a pair of current path electrodes, one of said current path electrodes of said third MOSFET being connected to said one electrodes of said first and second MOSFETs and another one of said current path electrodes of said third MOSFET serving as an output terminal for said multiplier, integrator means having an input terminal connected to said multiplier output terminal, having an output terminal and being responsive to signals received on its input terminal to integrate same between predetermined time intervals, memory means connected to said integrator means output terminal and receiving the integrated output signal thereof, said memory means including gating means for selectively passing said integrated output signal only when said first and second MOSFETs are current nonconductive, means coupling the output from said clock means to said memory gating means for enabling same whenever gating signals are removed from said first and second MOSFETs, and output means connected to said memory means for connecting said stored signal to a modulator and for supplying said stored signal as a control signal through such modulator.

2. The circuit according to claim 1 wherein means are provided for reducing the leakage paths of said integrator means and said memory means comprising a reference voltage input connected to said integrator and to said memory means, ground plane means adjacent said integrator means, and a capacitor connected to said reference voltage for forming a voltage pedestal for the stored signal in said memory means.

3. The circuit according to claim 2 wherein high impedance means are connected between said ground plane means and said one electrodes of said first and second MOSFETs.

4. The circuit according to claim 1 wherein said integrator means comprises a first resistor, an amplifier and a capacitor as the integrating elements, ground plane means are disposed adjacent to and supporting said resistor and capacitor, electrical signal receiving means are connected to said ground plane means for establishing a potential similar to the amplitude of the signal in said capacitor for reducing leakage thereof, said integrator means comprises reference signal input means connected to said signal receiving means, said analog memory includes a memory capacitor, memory ground plane means for mounting said memory capacitor, and a second resistor connects said memory ground plane means to said capacitor in said integrator.

5. The circuit according to claim 1 wherein, means are provided for supplying a total performance indicating signal, signal inversion means are electrically connected between one current path electrode of each one of said first and second MOSFETs, respectively, and said total performance indicating signal means, and plural rectifier means are connected to said field control electrode of said field control electrode of said third MOSFET and individually to said field electrodes of said first and second MOSFETs whereby said third MOSFET is current conductive if either of said first or second MOSFETs is current conductive, and a resistor is electrically connected between the ground plane in said integrator and said one current path electrode of said third MOSFET.

6. In a process control system wherein a contemporaneous electrical analog process performance indicating signal is sensed during time intervals of predetermined duration spaced from each other, said contemporaneous process performance indicating signal and its complement are made available during said time intervals, and wherein a clock and signal modulation source is provided for supplying an electrical control signal at such predetermined intervals, for supplying an electrical modulation signal having positive and negative half cycles of a frequency greater than that of said control signal for effecting modulation of a process variable during said time interval, and, in consequence, effecting modulation of said performance signal, and for supplying electrical pulses at a predetermined frequency substantially greater than that of said modulation frequency, an improved control channel circuit for controlling said process variable comprising the combination of:

means for obtaining an improved process performance indicating signal at the end of each of said time intervals of predetermined duration comprising means controlled by said electrical pulses of said clock and modulation source for gating pulses of said contemporaneous process performance indicating signal and its complement in succession to an output circuit during each of said time intervals of predetermined duration, and a long time-constant integrating circuit for receiving said gated pulses of said contemporaneous process performance indicating signal throughout each of said time intervals of predetermined duration and storing the net accumulation of said gated pulses as an analog signal, memory means activated by said electrical control signal at the end of each of said time intervals of predetermined duration for receiving and storing an analog signal from said integrating circuit corresponding to said net accumulated gated pulses, and means responsive to said net analog signal in said memory means for controlling said process variable in accordance therewith, said memory means being rendered unresponsive to said analog signal in said integrating circuit by said electrical control signal at the beginning of each succeeding one of said time intervals of predetermined duration.

7. The system according to claim 6 wherein the long time-constant integrating circuit comprises an operational amplifier, a pair of balanced MOSFETs connected as an input circuit for said operational amplifier, the field electrode of one of said pair of MOSFETs being connected to receive said gated pulses, and a capacitor connected from the output of said operational amplifier to said field electrode of said one MOSFET.

8. The system according to claim 6 wherein the means controlled by said electrical pulses of said clock and modulation source for gating pulses of said contemporaneous process performance indicating signal and its complement in succession to an output circuit during each of said time intervals of predetermined duration comprises a circuit having first, second and third MOSFETS each of which has a field electrode and a pair of current path electrodes, the field electrode of said first MOSFET being connected to such clock and modulation source for receiving such electrical pulses during one half cycle of said modulation signal, thereby rendering said first MOSFET conducting at each pulse during said one half cycle, the field electrode of said second MOSFET being connected to such clock and modulation source for receiving such electrical pulses during the succeeding half cycle of said modulation signal, thereby rendering said second MOSFET conducting at each pulse during said succeeding half cycle, one of said current path electrodes of each of said first and said second MOSFETs being connected together and the other ones of said current path electrodes of each of said first and second MOSFETs being connected to receive, respectively, said performance indicating signal and said complement of said performance indicating signal, one of said current path electrode of said third MOSFET forming an output path for said means and the field electrode of said third MOSFET being connected in separate circuits, to receive said electrical pulses during each half of such modulation signal, thereby rendering said third MOSFET conducting whenever either of said first and said second MOSFETs is conducting.

* * * * *